United States Patent [19]

Turchan

[11] Patent Number: 4,943,421

[45] Date of Patent: Jul. 24, 1990

[54] METHOD OF REDUCING THE OXIDES OF NITROGEN IN FOSSIL FUELS COMBUSTION AND COMBUSTION EFFLUENTS USING AMINE COMPOUNDS

[76] Inventor: Otto C. Turchan, 458 El Camino Dr., Beverly Hills, Calif. 90212

[21] Appl. No.: 324,574

[22] Filed: Mar. 16, 1989

[51] Int. Cl.$^5$ .......................... B01J 8/00; C01B 21/00
[52] U.S. Cl. .................................................. 423/235
[58] Field of Search ................... 423/235, 235 D, 239, 423/239 A

[56] References Cited

FOREIGN PATENT DOCUMENTS

| 2630202 | 3/1977 | Fed. Rep. of Germany . |
| 33324668 | 1/1985 | Fed. Rep. of Germany . |
| 51-76166 | 7/1976 | Japan . |
| 51-110490 | 9/1976 | Japan . |
| 54-99076 | 8/1979 | Japan . |

*Primary Examiner*—Gregory A. Heller

[57] ABSTRACT

The subject invention relates to a method for reducing the concentration of $NO_x$ formed in fossil fuels combustion process to harmless $N_2$ discharged in the combustion effluents and process comprising the step of interjecting aliphatic and/or aromatic amines compounds into the fuel combustion reaction mixture of fossil fuel combustion reactants or combustion reaction gas products in fossil fuel fired combustion apparatus or combustion device, to reduce the $NO_x$ present in the fuel combustion reaction gas products mixture to harmless molecular nitrogen $N_2$ and $N_2O$ by chemical reduction reaction with aliphatic and/or aromatic amines compounds admixture interjected into the fuel combustion reactants and/or fuel combustion reaction gas products.

1 Claim, No Drawings

METHOD OF REDUCING THE OXIDES OF NITROGEN IN FOSSIL FUELS COMBUSTION AND COMBUSTION EFFLUENTS USING AMINE COMPOUNDS

BACKGROUND OF THE INVENTION

My invention pertains to a method for reducing the concentration of oxides of nitrogen (NOx) formed in fossil fuels combustion and combustion effluents. In one aspect my invention relates, to the admixture of aliphatic amines and/or aromatic amines, to liquid fossil fuels for the reduction of the oxides of nitrogen produced in combustion of liquid fossil fuels such as gasolines and fuel oils, used in internal combustion engines, diesel engines, gas turbines, process furnaces, power plant boilers and other combustion equipment. In another aspect, my invention relates to the injection of aliphatic amines and/or aromatic amines, into the fossil fuels combustion reaction gas products, for the reduction of the oxides of nitrogen produced in the combustion of solid, liquid and gaseous fossil fuels and subsequently discharged in the combustion effluents from fossil fuels fired combustion apparatus and devices, including but not limited to gas turbines, power plant boilers, process furnaces, fired heaters, steam boilers.

Fossil fuels combustion waste products discharged from various combustion sources into ambient atmosphere have become a major cause of harmful air pollution resulting in serious smog problems. The major health irritants in smog are the oxides of nitrogen (NOx), amongst which nitrogen dioxide ($NO_2$) being extremely poisonous gas presents the most serious problem. Major portion of the NOx discharged into the atmosphere comes from fossil fuels combustion in automotive internal combustion engines, but stationary sources of NOx discharge such as power plants, fired boilers and process furnaces, incinerators and similar combustion equipment are also significant contributors. In these conbustion processes thermal NOx is formed as nitric oxide (NO) in the high temperature combustion zone from the nitrogen and oxygen in the combustion air and of the combustion gases. The high temperatures in the combustion zone favour NO formation, the original form in which the oxides of nitrogen are created in the combustion process. This NO is subsequently oxidized to $NO_2$, as soon as the lower temperatures required for this are reached in zones of great local air oxygen surplus and upon discharge into ambient air.

In prior art there have been considerable and numerous efforts to find an effective method of removing NO and $NO_2$ from combustion effluents by reduction with the injection of ammonia into the combustion effluents as the reducing agent, both with and without the aid of catalyst. The prior art relates to NOx reduction methods constrained to NO reduction in the combustion gases effluent flow downstream of the region of fuel combustion where the effluent gases have cooled down to the lower temperature range required by the catalyst to promote an effective catalytic reaction, without exposing the catalyst to unacceptable thermal degradation damage or destruction. A notable exception to the method of NOx reduction in the combustion effluent stream is the use of water or steam injection into the fuel combustion zone of stationary gas turbines to supress NO formation in the fuel combustion zone by decreasing the combustion zone flame temperatures.

SUMMARY OF THE INVENTION

Accordingly I claim the object of my invention a method for reduction of oxides of nitrogen formed in fossil fuels combustion by the use of admixture of aliphatic and/or aromatic amines compounds to the liquid fossil fuels as the NOx reducing agent in the combustion process of the fossil fuels, or by interjection of aliphatic and/or aromatic amines compounds into the fossil fuels products of combustion as the reducing agent for the reduction of oxides of nitrogen formed in the combustion process, prior to the discharge of the combustion products effluents into the atmosphere.

The high thermal efficiency combustion process depends on favourable conditions within the combustion chamber, such as excess of combustion air, air to fuel ratio, effective mixing of the fuel with combustion air, optimal flow in combustion zone for flame stability and proper choice of the air to fuel ratio for a given fuel combustion process. Main causes of incomplete fuel combustion under correct burning conditions and sufficient air surplus, can be a low reaction temperature or inadequate retention time of the reacting substances in the combustion reaction zone. Higher flame temperatures and longer retention times of reacting substances in the main conbustion reaction zone improve the combustion process, however, result in increased NOx formation in the combustion reaction zone. With some simplifications, the mechanism of NOx formation within the combustion flame and immediately after it, can be represented by the reaction between the nitrogen and oxygen contained within the high temperature combustion air, forming nitrogen oxides as follows $$N_2 + O_2 \rightarrow \text{Nitrogen oxides}.$$

Depending on combustion flame temperature and retention time, this reaction reaches sooner or later a condition of equilibrium, where as much NO is being dissociated to molecular $N_2 + O_2$ as is being formed anew, so that the NO content does not rise measurably any more. The speed with which this equilibrium is reached is first of all dependent on the combustion zone temperature and on the local air to fuel ratio. The NO content at this equilibrium is largely determined by the same two parameters as well.

The object of my invention is a method interjecting aliphatic and/or aromatic amines compounds as NOx reducing agents into the products of combustion of the fossil fuels combustion process to substantially remove the remaining NO by reduction to molecular $N_2$ and $H_2O$, in reaction with the NOx reducing agents mixture of amines contacted by the NO contained in the combustion products of the fuel combustion process. The further object of my invention is a method using aliphatic and/or aromatic amines compounds as the NOx reducing agents, for the reduction of NO formed in the combustion reaction process by the fossil fuels combustion.

The aliphatic amines compounds of methylamine, ethylamine, ethylenediamine and diethylenetriamine of ethyleneamines series, and the aromatic amines compounds of aniline, monoethylaniline, orthotoluidine and xylidines when used as rocket propulsion fuels proved to be powerful reducing agent in the combustion reaction process with a variety of oxides of nitrogen used as oxidizer in rocket bipropellant combinations. These amines compounds employed as rocket fuel propellents are used in combination with a variety of oxides of nitrogen as oxidizers, such as NO, $NO_2$, $N_2O_4$, mixed oxides of nitrogen, RFNA(NO 6.5 to 22%) and WFNA, where these bipropellant combinations are hypergolic (i.e. the fuel and oxidizer burn spontaneously upon contact). The hypergolic property of these bipropellent combinations is characteristic of the disposition of strong chemical reaction affinity between the fuel and oxidizer in the rapid oxidation-reduction process accompanied by the release of large amount of energy at a correspondingly large reaction rate. The consideration of the well proven and powerful properties of the above cited amines compounds for the reduction of the various oxides of nitrogen, established the chemical basis for selecting the aliphatic and/or aromatic amines compounds as the reducing agent admixture to the fossil fuels, for the reduction of oxides of nitrogen contained in the products of combustion formed in the fossil fuels combustion process.

DETAILED DESCRIPTION OF THE INVENTION

The subject of my invention relates to a method for removing the NO contained in the combustion reaction gasses as products of the fossil fuels combustion process, said method comprising the step of interjecting sufficient amount of aliphatic and/or aromatic amines compounds admixture to the fossil fuels combusting reaction products as the NOx reducing agent, to remove the NOx content present in the combustion gases by the reduction reaction of NOx with the interjected admixture of amines compounds.

In practice of this invention, in order to obtain affective removal of NOx including NO from the fossil fuels combustion products, it is important that the admixture of amines compounds used with the fossil fuels are thoroughly intermixed and dispersed into the combustion gases produced by the fossil fuels combustion reaction, to facilitate contact between the oxides of nitrogen and the interjected admixture of amines compounds.

The amount and rate at which aliphatic and/or aromatic amines compounds are needed in the fossil fuels combustion reaction for the reduction of NO formed in the fossil fuels combustion process, is primarily dependent on the rate and amount of NO generated in the combustion process, which in turn depends on the fuel consumption and type of fossil fuel used in the combustion process, as well as the type and design of the fossil fuels fired combustion apparatus or device. Fundamentally in the reduction reaction of 1 mole NO react with 1 mole of methylamine $CH_3NH_2$ to form 1 mole $N_2$ and 1 mole $H_2O$ in the process, or 1 mole NO reacting with ½ mole ethylenediamine $NH_2CH_2CH_2NH_2$ producing 1 mole each $N_2$ and $H_2O$. Consequently in a theoretically reduction reaction the amount of methylamine or ethylenediamine compound interjected into the combustion gases of fossil fuels combustion reaction, would range from 0.5 mole for ethylenediamine to 1.0 mole for methylamine per mole of No formed in the fuel combustion process. However, the perfect mixture conditions, in which the total amount NO contained in the mixture of combustion gases comes into contact with the total amount of the interjected amines compounds in the same mixture at any given instant of time, can not be realistically achieved; thus allowing a fraction of the NO to escape the reduction reaction in the case that only the theoretically exact amount of the amines compounds, as described above, were interjected into the fuel combustion reaction gases. Therefore, in order to assure that substantially all of the NO formed in the fuel combustion process in reducted to $N_2$ and $H_2O$, an excess amount of the respective amines compounds over and above the theoretically required amount, will be interjected into the fuel combustion reaction gases, until reduction of sustantially all NO is accomplished.

The aliphatic and/or aromatic amines compounds reduction reaction of NOx content in the fossil fuels combustion reaction gases is carried out at the operating combustion pressures of the respective types of combustion devices, for combustion pressure ranging from about 0.5 atmosphere to 100 atmospheres.

For example in a typical gas turbine combustion process the combustion of 1 kg of diesel fuel produces about 20 g $NO_2$ discharged in the gas turbine combustion effluents, which is approximately 0.435 moles of $NO_2$ per kg of diesel fuel combustion, representing about 0.284 moles of NO formed in the combustion of 1 kg of diesel fuel in the gas turbine. Using the ratio of 0.5 moles of ethylenediamine for the reduction of 1 mole of NO, the amount of ethylenediamine, to be interjected into the gas turbine combustion reaction zone gases, needed for reduction of all NO formed in combustion of 1 kg of diesel fuel oil equals 0.142 moles equal to about 8.54 g of ethylenediamine per 1 kg of diesel oil consumed in gas turbine fuel combustion.

In an embodiment of my invention for a stationary gas turbine operating on the combustion of fuel oil or natural gas, the amount of ethylenediamine needed for the reduction of the NO formed in the gas turbine combustion reaction gases produced in the process of the fuels combustion, is injected in water solution as admixture to the gas turbine combustion fuel into said fuel combustion produced gases.

In another embodiment of my invention for gas turbines, internal combustion engines, automotive internal combustion engines, power plant boilers as well as other fossil fuel fired combustion devices operating on combustion of liquid fossil fuels, the amount of the amines compounds needed for the reduction of the amount of NO formed in the combustion process of liquid fossil fuels, is interjected into the combustion reaction zone(s) by the liquid fossil fuel blend containing the admixture of aliphatic amines compounds such as, methylamine, ethylamine, ethylenediamine, or aromatic amines compounds such as analine, or combinations thereof.

In yet another embodiment of my invention for fossil fuels fired combustion apparatus operating on the comtbustion of solid fuels, gaseous fuels as well as liquid fuels, the amount of amines compounds needed for the reduction of the given amount of NO formed in the fuel combustion process, are interjected into the combustion reaction zones, by water solution containing the amines compounds, where the water propells and mixes the amines compounds with the combustion fuel, combustion air and combustion product gases containing the NO which undergoes the reduction process with the interjected amines compounds to be converted to harmless molecular nitrogen $N_2$ and water.

While the above description contains many specificities, the reader should not construe these as limitations on the scope of the invention, but merely as exemplifications of prefered embodiments thereof. For example skilled artisans will readily be able to change the proportions of the amounts of the aliphatic amines and/or aromatic amines compounds interjected into the fossil fuels combustion reaction produced gases, make adjustments in the amounts needed for the reduction of the total amount of NO formed in the fuel combustion process which is strongly influenced and dependent on a given fossil fueled combustion apparatus type and design, as well as the type of fuel used. They can make many variations in the method of interjecting the aliphatic and/or aromatic amines compounds into the fuels combustion reaction produced gases. In fact they can redesign and make physical changes in combustion devices wherein the aliphatic and/or aromatic amines compounds could be interjected into the combustion process by admixture to the combustion air. Accordingly the reader is requested to determine the scope of my invention by the appended claims and their legal equivalents and not by the examples which have been given.

What I claim is:

1. A process for the reduction of oxides of nitrogen formed in the combustion of fossil fuels, within a fuel combustion reaction zone of a fossil fuels fired combustion apparatus or combustion device, the said oxides of nitrogen reduction process comprising: the step of interjecting an admixture of oxides of nitrogen reducing agents consisting essentially of methylamine, ethylamine, ethylenediamine, diethylenetriamine, aniline, monoethylaniline, toluidine and xylidine, interjected individually or in any combination into the said fuel combustion reaction zone containing combustion fuel, combustion air and products of fuel combustion, including said oxides of nitrogen generated in the combustion of said fossil fuels, wherein the said admixture of oxides of nitrogen reducing agents react with the said oxides of nitrogen generated within the said fuel combustion reaction zone, converting the oxides of nitrogen by the reduction process with said mixture of oxides of nitrogen reducing agents, to harmless molecular $N_2$ and $H_2O$ in the fossil fuels combustion products effluents discharged to the ambient atmosphere from said fossil fuels fired combustion apparatus or combustion device and wherein a fossil fuels combustion apparatus or combustion device uses a liquid fossil fuel for combustion, and the said admixture of oxides of nitrogen reducing agents is blended into said liquid fossil fuels, wherein the resulting combination of said admixture of oxides of nitrogen reducing agents intermixed with said liquid fossil fuels is delivered into the combustion reaction zone of said combustion apparatus or combustion device, in combination with said liquid fossil fuels.

* * * * *